US008743108B2

(12) United States Patent
Jang et al.

(10) Patent No.: US 8,743,108 B2

(45) Date of Patent: Jun. 3, 2014

(54) LIQUID CRYSTAL DISPLAY AND METHOD OF DRIVING THE SAME USING BLACK DATA INSERTION METHOD RESPONSIVE TO CHANGES IN FRAME FREQUENCY TO PREVENT FLICKER

(75) Inventors: Suhyuk Jang, Daegu (KR); Jongwoo Kim, Kyungbuk (KR)

(73) Assignee: LG Display Co., Ltd., Seoul (KR)

( * ) Notice: Subject to any disclaimer, the term of this patent is extended or adjusted under 35 U.S.C. 154(b) by 597 days.

(21) Appl. No.: 12/292,694

(22) Filed: Nov. 24, 2008

(65) Prior Publication Data

US 2009/0160845 A1 Jun. 25, 2009

(30) Foreign Application Priority Data

Dec. 21, 2007 (KR) ........................ 10-2007-0135788

(51) Int. Cl.

| | |
|---|---|
| *G09G 3/18* | (2006.01) |
| *G09G 3/20* | (2006.01) |
| *G09G 3/36* | (2006.01) |
| *G09G 5/10* | (2006.01) |
| *G06F 3/038* | (2013.01) |
| *G09G 5/00* | (2006.01) |
| *H04N 7/01* | (2006.01) |
| *H04N 11/20* | (2006.01) |

(52) U.S. Cl.

USPC ................. 345/214; 345/50; 345/55; 345/87; 345/89; 345/92; 345/99; 345/204; 345/690; 348/443

(58) Field of Classification Search

USPC ........................................................ 345/214

See application file for complete search history.

(56) References Cited

U.S. PATENT DOCUMENTS

| | | | | |
|---|---|---|---|---|
| 5,461,424 | A * | 10/1995 | Shimizu | 348/443 |
| 6,836,293 | B2 * | 12/2004 | Itoh et al. | 348/452 |
| 2004/0246242 | A1 * | 12/2004 | Sasaki | 345/204 |
| 2005/0259064 | A1 | 11/2005 | Sugino et al. | |
| 2006/0028463 | A1 * | 2/2006 | Nakamura et al. | 345/204 |
| 2006/0170639 | A1 * | 8/2006 | Kawaguchi et al. | 345/98 |
| 2007/0152934 | A1 | 7/2007 | Maeda | |
| 2007/0182700 | A1 * | 8/2007 | Baba et al. | 345/102 |
| 2008/0136752 | A1 * | 6/2008 | Inoue et al. | 345/77 |
| 2008/0198120 | A1 * | 8/2008 | Senda et al. | 345/92 |
| 2008/0225062 | A1 * | 9/2008 | Chang et al. | 345/691 |
| 2009/0122207 | A1 * | 5/2009 | Inoue et al. | 348/739 |

FOREIGN PATENT DOCUMENTS

| | | | |
|---|---|---|---|
| JP | 2007286135 | A * | 11/2007 |
| WO | WO 2006100906 | A1 * | 9/2006 |

OTHER PUBLICATIONS

German Office Action (Application No. 102008061119.0), dated Apr. 30, 2012, with English translation.

* cited by examiner

*Primary Examiner* — Alexander S Beck
*Assistant Examiner* — K. Kiyabu
(74) *Attorney, Agent, or Firm* — Morgan, Lewis & Bockius LLP

(57) ABSTRACT

A liquid crystal display includes a liquid crystal panel having liquid crystal cells in a matrix array at crossings of data lines and gate lines, a data drive circuit for providing data signals to the data lines, a gate drive circuit for providing gate signals to the gate lines, and a timing controller for receiving video data and timing signals, for checking a frame frequency of the video data in real-time to detect changes in the frame frequency, and for outputting a gate timing control signal to control the gate driving circuit in response to changes in the frame frequency and a data timing control signal for controlling the data driving circuit, wherein the gate timing control signal controls black data insertion percentage in a frame.

11 Claims, 15 Drawing Sheets

CRT

LCD

FIG. 7

| input Frame Rate | 75Hz | 60Hz | 60Hz |
|---|---|---|---|
| 1 Frame Time | 13.33 msec | 16.67 msec | 20 msec |
| BDI% (30%) | 3.999 msec | 4.999 msec | 6 msec |
| BDI% (24%) | | 4.0 msec | 4.8 msec |
| BDI% (20%) | | | 4.0 msec |

FIG. 11A

Nth Frame

| | SF1 | SF2 | SF3 | SF4 | SF5 |
|---|---|---|---|---|---|
| BL1 | Data Write<br>GSP(P1),GOE(T1) | Data Hold<br>GOE(T2) | Data Hold<br>GOE(T2) | Data Hold<br>GOE(T2) | Black insertion<br>GSP(P2),GOE(T3) |
| BL2 | Black insertion<br>GSP(P2),GOE(T3) | Data Write<br>GSP(P1),GOE(T1) | Data Hold<br>GOE(T2) | Data Hold<br>GOE(T2) | Data Hold<br>GOE(T2) |
| BL3 | Data Hold<br>GOE(T2) | Black insertion<br>GSP(P2),GOE(T3) | Data Write<br>GSP(P1),GOE(T1) | Data Hold<br>GOE(T2) | Data Hold<br>GOE(T2) |
| BL4 | Data Hold<br>GOE(T2) | Data Hold<br>GOE(T2) | Black insertion<br>GSP(P2),GOE(T3) | Data Write<br>GSP(P1),GOE(T1) | Data Hold<br>GOE(T2) |
| BL5 | Data Hold<br>GOE(T2) | Data Hold<br>GOE(T2) | Data Hold<br>GOE(T2) | Black insertion<br>GSP(P2),GOE(T3) | Data Write<br>GSP(P1),GOE(T1) |

BDI 20%

FIG. 11B

Nth Frame

| | SF1 | SF2 | SF3 | SF4 | SF5 |
|---|---|---|---|---|---|
| BL1 | Data Write GSP(P1),GOE(T1) | Data Hold GOE(T2) | Data Hold GOE(T2) | Black insertion GSP(P2),GOE(T3) | Black Hold GOE (high logic hold) |
| BL2 | Black Hold GOE (high logic hold) | Data Write GSP(P1),GOE(T1) | Data Hold GOE(T2) | Data Hold GOE(T2) | Black insertion GSP(P2),GOE(T3) |
| BL3 | Black insertion GSP(P2),GOE(T3) | Black Hold GOE (high logic hold) | Data Write GSP(P1),GOE(T1) | Data Hold GOE(T2) | Data Hold GOE(T2) |
| BL4 | Data Hold GOE(T2) | Black insertion GSP(P2),GOE(T3) | Black Hold GOE (high logic hold) | Data Write GSP(P1),GOE(T1) | Data Hold GOE(T2) |
| BL5 | Data Hold GOE(T2) | Data Hold GOE(T2) | Black insertion GSP(P2),GOE(T3) | Black Hold GOE (high logic hold) | Data Write GSP(P1),GOE(T1) |

BDI 40%

FIG. 11C

Nth Frame

| | SF1 | SF2 | SF3 | SF4 | SF5 |
|---|---|---|---|---|---|
| BL1 | Data Write GSP(P1),GOE(T1) | Data Hold GOE(T2) | Black insertion GSP(P2),GOE(T3) | Black Hold GOE (high logic hold) | Black Hold GOE (high logic hold) |
| BL2 | Black Hold GOE (high logic hold) | Data Write GSP(P1),GOE(T1) | Data Hold GOE(T2) | Black insertion GSP(P2),GOE(T3) | Black Hold GOE (high logic hold) |
| BL3 | Black Hold GOE (high logic hold) | Black Hold GOE (high logic hold) | Data Write GSP(P1),GOE(T1) | Data Hold GOE(T2) | Black insertion GSP(P2),GOE(T3) |
| BL4 | Black insertion GSP(P2),GOE(T3) | Black Hold GOE (high logic hold) | Black Hold GOE (high logic hold) | Data Write GSP(P1),GOE(T1) | Data Hold GOE(T2) |
| BL5 | Data Hold GOE(T2) | Black insertion GSP(P2),GOE(T3) | Black Hold GOE (high logic hold) | Black Hold GOE (high logic hold) | Data Write GSP(P1),GOE(T1) |

BDI 60%

FIG. 11D

Nth Frame

| | SF1 | SF2 | SF3 | SF4 | SF5 |
|---|---|---|---|---|---|
| BL1 | Data Write GSP(P1),GOE(T1) | Black insertion GSP(P2),GOE(T3) | Black Hold GOE (high logic hold) | Black Hold GOE (high logic hold) | Black Hold GOE (high logic hold) |
| BL2 | Black Hold GOE (high logic hold) | Data Write GSP(P1),GOE(T1) | Black insertion GSP(P2),GOE(T3) | Black Hold GOE (high logic hold) | Black Hold GOE (high logic hold) |
| BL3 | Black Hold GOE (high logic hold) | Black Hold GOE (high logic hold) | Data Write GSP(P1),GOE(T1) | Black insertion GSP(P2),GOE(T3) | Black Hold GOE (high logic hold) |
| BL4 | Black Hold GOE (high logic hold) | Black Hold GOE (high logic hold) | Black Hold GOE (high logic hold) | Data Write GSP(P1),GOE(T1) | Black insertion GSP(P2),GOE(T3) |
| BL5 | Black insertion GSP(P2),GOE(T3) | Black Hold GOE (high logic hold) | Black Hold GOE (high logic hold) | Black Hold GOE (high logic hold) | Data Write GSP(P1),GOE(T1) |

BDI 80%

LIQUID CRYSTAL DISPLAY AND METHOD OF DRIVING THE SAME USING BLACK DATA INSERTION METHOD RESPONSIVE TO CHANGES IN FRAME FREQUENCY TO PREVENT FLICKER

This application claims the benefit of Korea Patent Application No. 10-2007-0135788 filed on Dec. 21, 2007, which is hereby incorporated by reference in its entirety.

BACKGROUND OF THE INVENTION

1. Field of the Invention

The embodiments of the invention relate to a display, and more particularly, to a liquid crystal display and method of driving the same. Although embodiments of the invention are suitable for a wide scope of applications, it is particularly suitable for preventing a flicker phenomenon of a liquid crystal display driven while driving with a black data insertion method.

2. Discussion of the Related Art

Active matrix type liquid crystal displays display a moving picture using a thin film transistor (TFT) as a switching element. The active matrix type liquid crystal displays have been implemented televisions as well as display devices in portable devices, such as office equipment and computers, because of the thin profile of an active matrix type liquid crystal displays. Accordingly, cathode ray tubes (CRT) are being replaced by active matrix type liquid crystal displays.

A blur phenomenon occurs in which a moving picture displayed on the screen of a liquid crystal display is not clear and blurry because of hold characteristics of the liquid crystal material. As shown in FIG. 1, the CRT provides data to cells by causing a phosphor to emit light for a very short period of time so as to display an image in an impulse drive manners. On the other hand, the liquid crystal display, as shown in FIG. 2, displays an image in a hold drive manner by supplying data to liquid crystal cells during a scan period and by holding data charged to the liquid crystal cells during the remaining field period (or a frame period).

Because the CRT displays the moving picture in the impulse drive manner, as shown in FIG. 3, a perceived image which a viewer perceives as clearer. On the other hand, as shown in FIG. 4, in the liquid crystal display, light and darkness of a perceived image which a viewer feels are not clear and blurry because of the hold characteristics of liquid crystals. A difference between the perceived images of the CRT and the liquid crystal display is caused by an integral effect of an image temporarily held in eyes following a movement. Accordingly, even if the liquid crystal display has a fast response time, the viewer watches a blurry image because there is a difference between the movement of the eyes and a static image of each frame. A black data insertion (BDI) method has been proposed so as to improve the motion blur phenomenon. In the black data insertion method, after video data is written on the screen, the liquid crystal display is driven in an impulse drive manner by supplying black data to the screen.

As an example of the black data insertion method, a screen is division-driven by dividing the screen into a plurality of blocks, and each block is driven by going through a data voltage write operation, a data hold operation, and a black data insertion operation in the order named. In the related art black data insertion method, a black data insertion percentage is fixed irrespective of a frame rate. The black data insertion percentage, as shown in FIG. 5, is defined by a rate of 1-frame period occupied by a black data insertion period in terms of percentage.

Since the related art black data insertion method fixes the black data insertion percentage irrespective of the frame rate, a flicker phenomenon in which a display screen appears to flicker occurs when the frame rate changes. For example, it is assumed that there is a liquid crystal display in which three frame frequencies of 50 Hz, 60 Hz, and 75 Hz are supported and a black data insertion percentage is fixed at 30%. As shown in FIG. 6, because a black data insertion period is about 3.99 ms at the frame frequency of 75 Hz (13.33 ms), a flicker level is low to the extent that a viewer does not recognize the flicker phenomenon. However, because black data insertion percentage is fixed at 30%, a black data insertion period increases to 6.0 ms when the frame frequency falls to 50 Hz. Accordingly, the related art black data insertion method generates the flicker phenomenon when the frame frequency is decreased.

SUMMARY OF THE INVENTION

Accordingly, embodiments of the invention is directed to a liquid crystal display and method of driving the same that substantially obviates one or more of the problems due to limitations and disadvantages of the related art.

An object of embodiments of the invention is to provide a liquid crystal display and a method of driving the same capable of preventing a flicker phenomenon of the liquid crystal display driven using a black data insertion method.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a liquid crystal display includes a liquid crystal panel having liquid crystal cells in a matrix array at crossings of data lines and gate lines, a data drive circuit for providing data signals to the data lines, a gate drive circuit for providing gate signals to the gate lines, and a timing controller for receiving video data and timing signals, for checking a frame frequency of the video data in real-time to detect changes in the frame frequency, and for outputting a gate timing control signal to control the gate driving circuit in response to changes in the frame frequency and a data timing control signal for controlling the data driving circuit, wherein the gate timing control signal controls black data insertion percentage in a frame.

In another aspect, a liquid crystal display includes a liquid crystal panel having liquid crystal cells in a matrix array at crossings of data lines and gate lines, a data drive circuit for providing data signals to the data lines, a gate drive circuit for providing gate signals to the gate lines, and a timing controller for receiving video data and timing signals, for checking a frame frequency of the video data in real-time to detect changes in the frame frequency, and for outputting a gate timing control signal to the gate driving circuit for maintaining a black data insertion period within a frame period for a range of frame frequencies and a data timing control signal for controlling the data driving circuit.

In yet another aspect, a method for driving a liquid crystal display having a liquid crystal panel with liquid crystal cells, a data drive circuit, a gate drive circuit, and a timing controller includes counting a timing signal based on a fixed clock signal to check a frame frequency in real-time of a current input image, maintaining a current black data insertion percentage if there is no change in the frame frequency, and changing a current black data insertion percentage if there is a change in the frame frequency.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 7 is a diagram for explaining a black data insertion percentage depending on changes in a frame frequency in a liquid crystal display according to an exemplary embodiment;

FIGS. 11A to 11D are diagrams showing changes in a black data insertion percentage depending on a frame frequency.

DETAILED DESCRIPTION OF THE PREFERRED EMBODIMENTS

Figure 1:
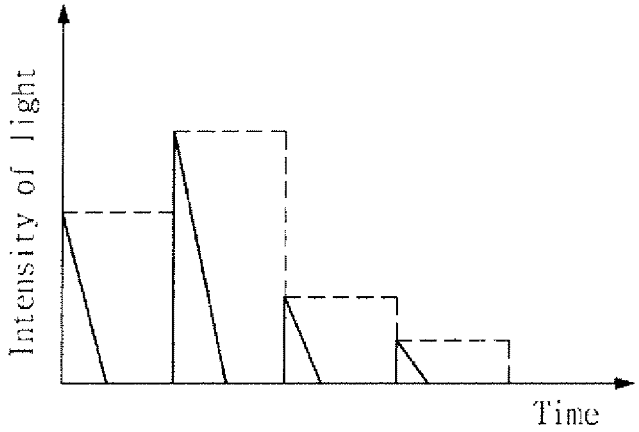
FIG. 1 (PRIOR ART)
FIG. 1 is a diagram showing light emitting characteristics of a cathode ray tube.
Figure 2:
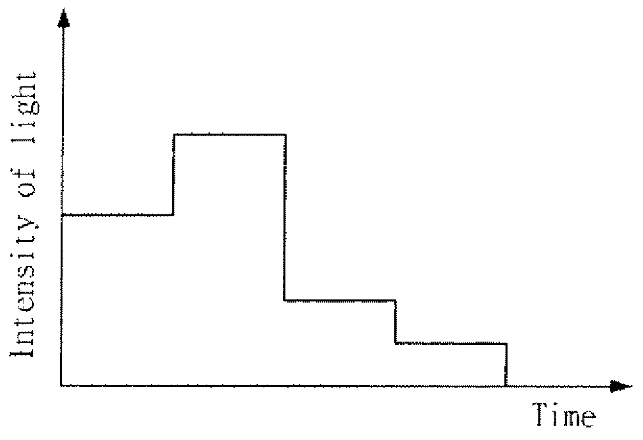
FIG. 2 (PRIOR ART)
FIG. 2 is a diagram showing light emitting characteristics of a liquid crystal display.
Figure 3:
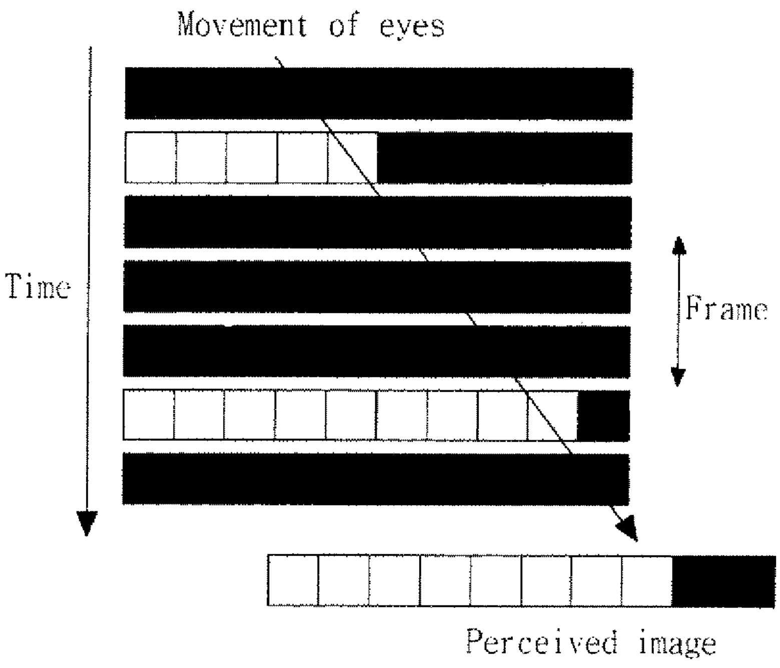
FIG. 3 (PRIOR ART)
FIG. 3 is a diagram showing a perceived image of a cathode ray tube which a viewer feels.
Figure 4:
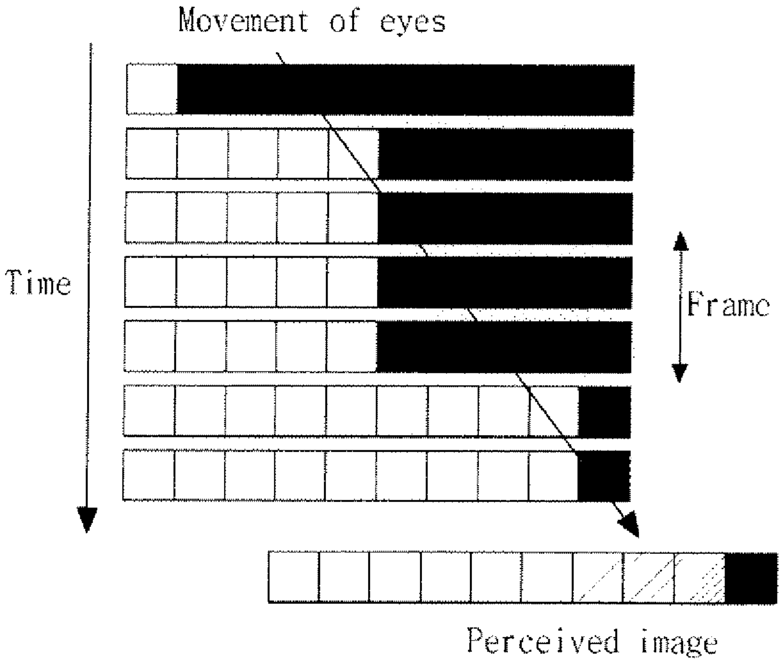
FIG. 4 (PRIOR ART)
FIG. 4 is a diagram showing a perceived image of a liquid crystal display which a viewer feels.
Figure 5:
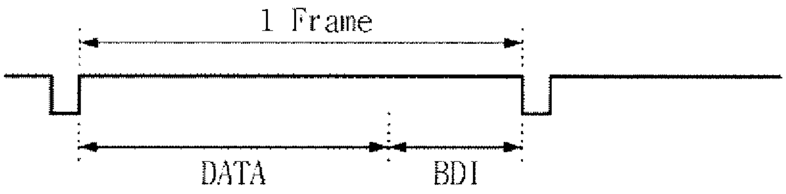
FIG. 5 (PRIOR ART)
FIG. 5 is a diagram showing an example of a black data insertion (BDI) percentage.
Figure 6:
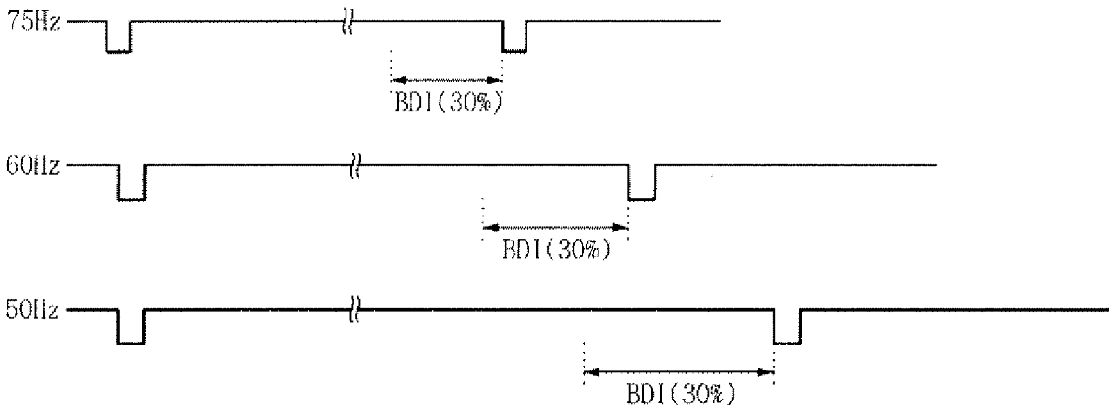
FIG. 6 (PRIOR ART)
FIG. 6 is a diagram showing an example of a fixed black data insertion percentage depending on changes in a frame frequency.

Hereinafter, an exemplary embodiment will be described in detail with reference to FIGS. 7 to 12.

As shown in FIG. 7, a method of driving a liquid crystal display according to an exemplary embodiment shortens a black data insertion period within 1-frame period by checking a frame frequency in real-time so as to prevent flicker when the frame frequency decreases. When a black data insertion percentage is 30% at a frame frequency of 75 Hz (13.33 ms), the black data insertion period is 3.99 ms. Therefore, a flicker level is low to the extent that a viewer does not recognize the flicker phenomenon. When the frame frequency falls from 75 Hz to 60 Hz (16.67 ms), the black data insertion percentage is lowered to 24% (4.0 ms). When the frame frequency falls from 75 Hz to 50 Hz (20 ms) or from 60 Hz to 50 Hz, the black data insertion percentage is lowered to 20% (4.0 ms). Accordingly, the method of driving the liquid crystal display according to the exemplary embodiment can maintain the black data insertion period at a value equal to or less than 4.0 ms within the 1-frame period for a range of frame frequencies by checking the frame frequency in real-time so that a viewer does not see flicker when the frame frequency decreases.

If the black data insertion percentage is fixed at a low value when the frame frequency rises after a fall in the frame frequency, the black data insertion percentage within the 1-frame period is low. Therefore, a sufficient impulse effect cannot be obtained. Accordingly, when the frame frequency increases after a decrease in the frame frequency, the black data insertion percentage within the 1-frame period is increased so as to obtain a satisfactory impulse effect. For instance, when the frame frequency rises from 50 Hz to 60 Hz, the black data insertion percentage rises from 20% to 24%. Further, when the frame frequency rises from 50 Hz to 75 Hz or from 60 Hz to 75 Hz, the black data insertion percentage rises to 30%.

The method of driving the liquid crystal display according to the exemplary embodiment controls gate timing control signals applied to each of gate drive integrated circuits (ICs) for division-driving a screen to thereby adjust the black data insertion percentage.

FIGS. 8 to 11D are diagrams for explaining an example where a black data insertion percentage changes in a range between 20% and 80% when a screen is division-driven using 5 gate drive ICs in a state where the screen is divided into 5 blocks.

Figure 8:
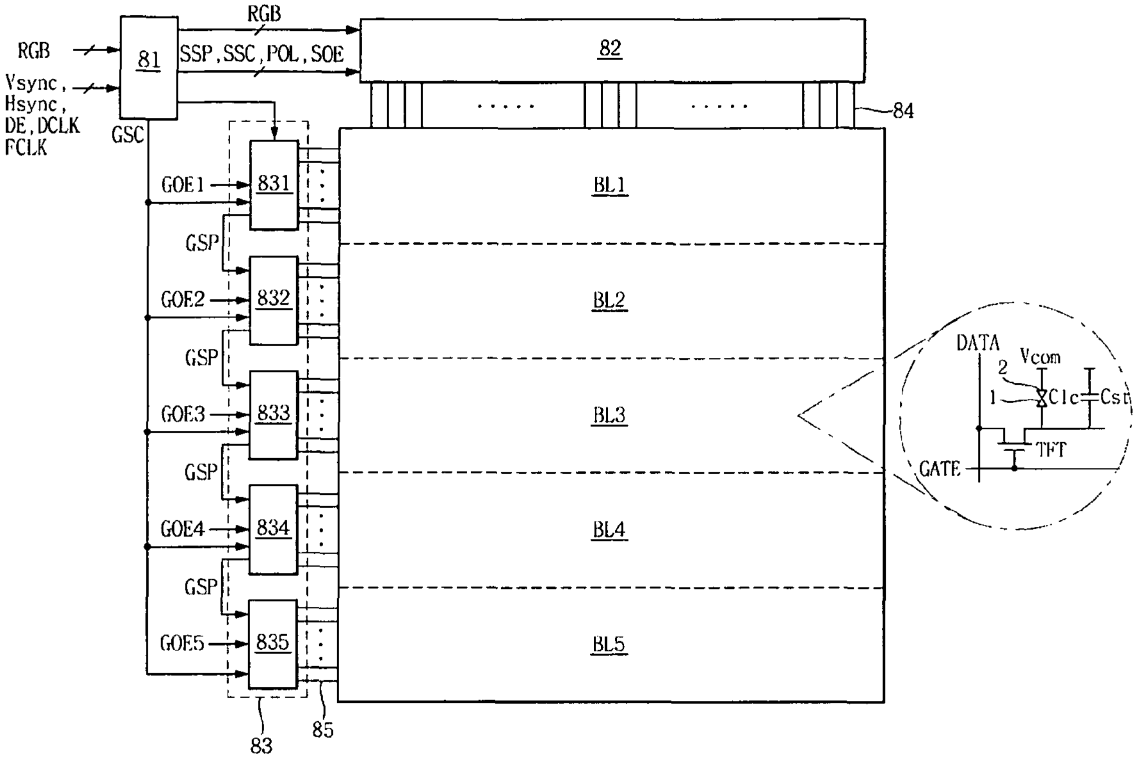
FIG. 8 is a black diagram of the liquid crystal display according to the exemplary embodiment.

As shown in FIG. 8, the liquid crystal display according to the exemplary embodiment includes a liquid crystal display panel, a timing controller 81, a data drive circuit 82, and a gate drive circuit 83. The data drive circuit 82 includes a plurality of source drive ICs (not shown). The gate drive circuit 83 includes a plurality of gate drive ICs 831 to 835.

In the liquid crystal display panel, a liquid crystal layer is formed between two glass substrates. The liquid crystal display panel includes m×n liquid crystal cells Clc arranged in a matrix array at each crossing of m data lines 84 and n gate lines 85.

The data lines 84, the gate lines 85, thin film transistors (TFTs), and a storage capacitor Cst are formed on a lower glass substrate of the liquid crystal display panel. The liquid crystal cell Clc is connected to the TFT and is driven by an electric field between pixel electrodes 1 and a common electrode 2. A black matrix, a color filter, and a common electrode 2 are formed on an upper glass substrate of the liquid crystal display panel. The common electrode 2 is formed on the upper glass substrate in a vertical electric drive manner, such as a twisted nematic (TN) mode and a vertical alignment (VA) mode. The common electrode 2 and the pixel electrode 1 are formed on the upper glass substrate in a parallel electric drive manner, such as an in-plane switching (IPS) mode and a fringe field switching (FFS) mode. Polarizers having optical axes that cross at a right angle are attached respectively to the upper and lower glass substrates. Alignment layers for setting a pre-tilt angle of the liquid crystal in an interface contacting the liquid crystal are respectively formed on the upper and lower glass substrates.

A display screen of the liquid crystal display panel is division-driven by dividing the display screen into a plurality of blocks BL1 to BL5 depending on gate timing control signals applied to the gate drive ICs 831 to 835. When the black data insertion percentage is less than or equal to 20%, the blocks BL1 to BL5 are driven by sequentially going through a data write operation, a data hold operation, and a black insertion operation in the order named. When the black data insertion percentage is more than 20%, the blocks BL1 to BL5 are driven by sequentially going through a data write operation, a data hold operation, a black insertion operation, and a black hold operation in the order named.

The timing controller 81 receives timing signals, such as vertical and horizontal sync signals Vsync and Hsync, a data enable signal DE, a dot clock signal DCLK, a fixed clock signal FCLK, and generates control signals for controlling operation timing of the data drive circuit 82 and the gate drive circuit 83. These control signals include a gate timing control signal and a data timing control signal. The timing controller 81 checks the frame frequency in real-time to thereby detect changes in the frame frequency. When the frame frequency falls, the timing controller 81 controls the gate timing control signal to thereby reduce the black data insertion percentage. When the frame frequency rises, the timing controller 81 controls the gate timing control signal to thereby increase the black data insertion percentage. The timing controller 81 supplies digital video data RGB to the data drive circuit 82.

The gate timing control signal includes a gate start pulse GSP, a gate shift clock signal GSC, a gate output enable signal GOE, and so on.

The gate start pulse GSP is applied to the first gate drive IC 831 and indicates a scan start line of a scan operation so that the first gate drive IC 831 generates a first gate pulse. The gate shift clock signal GSC is a clock signal for shifting the gate start pulse GSP. Shift registers of the gate drive ICs 831 to 835 shift the gate start pulse GSP and a gate pulse to a next stage at a rising edge of the gate shift clock signal GSC. The second to fifth gate drive ICs 832 to 835 receive a last output of the first gate drive IC 831 as the gate start pulse GSP and generate a first gate pulse. The gate output enable signal GOE is independently applied to the gate drive ICs 831 to 835. The gate drive ICs 831 to 835 output a gate pulse during a low logic period of the gate output enable signal GOE, i.e., during a period of time ranging from immediately after a falling time of a pulse to immediately before a rising time of a next pulse. The gate drive ICs 831 to 835 do not generate a gate pulse during a high logic period of the gate output enable signal GOE.

The data timing control signal includes a source start pulse SSP, a source sampling clock signal SSC, a polarity control signal POL, a source output enable signal SOE, and so on. The source start pulse SSP indicates a start pixel in 1 -horizontal line to which data will be displayed. The source sampling clock signal SSC directs a data latch operation to the data drive circuit 82 based on a rising or falling edge. The polarity control signal POL controls a polarity of an analog video data voltage output from the data drive circuit 82. The source output enable signal SOE controls an output of the source drive IC. The data timing control signal may further include a pre-charge control signal. The data drive circuit 82 supplies positive and negative pre-charge voltages prior to positive and negative data voltages in response to the pre-charge control signal so as to reduce a swing width of an analog voltage supplied to the data lines 84.

A frame frequency detector is mounted inside the timing controller 81. The frame frequency detector counts the vertical sync signal Vsync based on the fixed clock signal FLCK to detect a frame frequency of a current input image. The fixed clock signal FLCK is a clock signal always generated at a constant frequency irrespective of the frame frequency. A voltage controlled oscillator (VCO) mounted inside the timing controller 81 may generate the fixed clock signal FLCK. Because frequencies of timing signals, such as the dot clock signal DCLK, the horizontal sync signal Hsync, and the data enable signal, change together with the vertical sync signal Vsync when the frame frequency changes, the timing signals cannot be used as a reference signal for checking changes in the frame frequency. When the frame frequency changes, the timing controller 81 controls the gate timing control signal, in particular, timings of the gate start pulse GSP and the gate output enable signals GOE to change the black data insertion percentage depending on changes in the frame frequency. In another exemplary embodiment, the frame frequency detector and a timing signal modulation circuit are connected to an existing timing controller instead of the timing controller 81, and thus a gate timing control signal and a data timing control signal output from the existing timing controller can be modulated depending on the frame frequency.

Each data drive IC of the data drive circuit 82 includes a shift register, a latch, a digital-to-analog converter, an output buffer, and so on. The data drive circuit 82 latches the digital video data RGB under the control of the timing controller 81. After the data drive circuit 82 supplies a black gray scale voltage generated as a charge-share voltage or positive and negative pre-charge voltages to the data lines 84, the digital video data RGB is converted into analog positive and negative gamma compensation voltages in response to the polarity control signal POL to generate positive and negative analog data voltages. Then, the positive and negative analog data voltages are supplied to the data lines 84. The data drive circuit 82 supplies the data voltage to the data lines 84 for a scan time of the blocks BL1 to BL5 driven as a data write block, and supplies the black gray scale voltage to the data lines 84 for a scan time of the blocks BL1 to BL5 driven as a black insertion block.

Each of the gate drive ICs 831 to 835 includes a shift register, a level shifter for shifting an output signal of the shift register to a swing width suitable for a TFT drive of the liquid crystal cell, and an output buffer connected between the level shifter and the gate lines 85. The gate drive ICs 831 to 835 sequentially supply the gate pulse to the gate lines 85 in response to the gate timing control signal. The gate drive ICs 831 to 835 drive the blocks BL1 to BL5 so that the blocks BL1 to BL5 go through a data write operation, a data hold operation, a black insertion operation, and a block hold operation in response to the gate start pulse GSP and the gate output enable signals GOE1 to GOE5 of the gate timing control signal that change depending on changes in the frame frequency.

The timing controller 81 together with the data drive circuit 82 can generate the black gray scale voltage supplied to the liquid crystal cells of the black insertion block. The timing controller 81 inserts digital black gray scale data between the digital video data RGB so as to synchronize with the scan time of the black insertion block. The data drive circuit 82 can convert the digital black gray scale data into an analog black gray scale voltage. As a method for increasing a duty ratio of the source output enable signal SOE or the pre-charge control signal, the timing controller 81 may charge the black gray scale voltage to the liquid crystal cells of the black insertion block. In this case, the timing controller 81 according to the exemplary embodiment does generate a separate black gray scale voltage by increasing a write time of the charge-share voltage or the pre-charge voltage in the liquid crystal cell for the black insertion effect so that an impulse drive effect can be obtained from the charge-share voltage or the pre-charge voltage.

Figure 9:
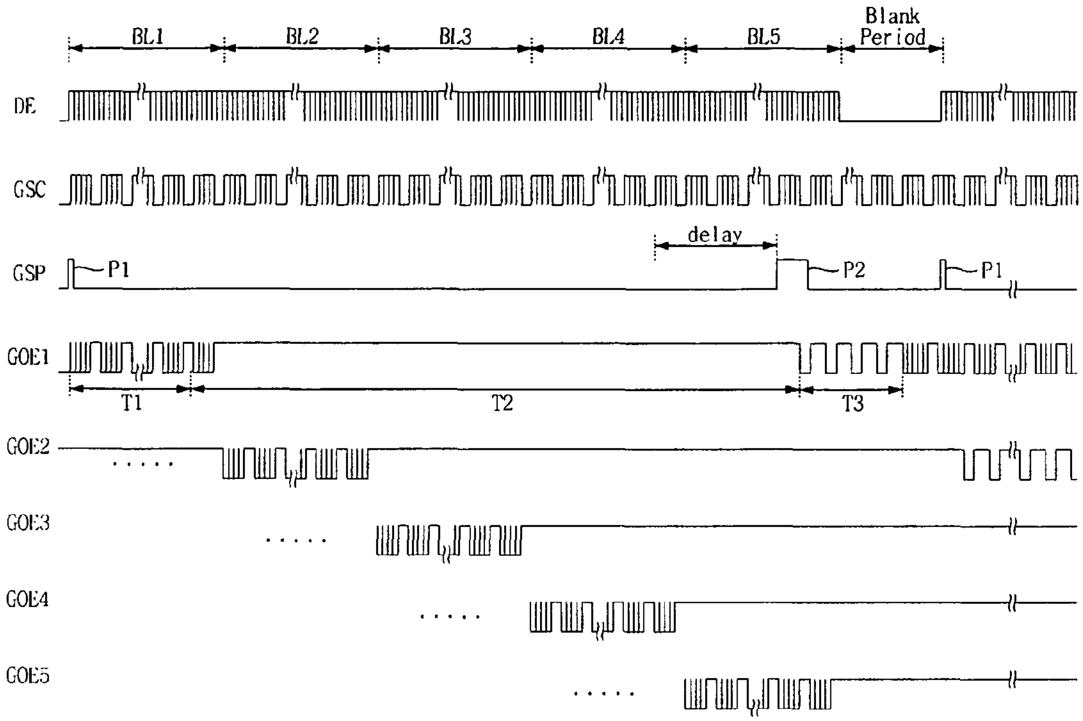
FIG. 9 is a waveform diagram showing a gate timing control signal shown in FIG. 8.
Figure 10:
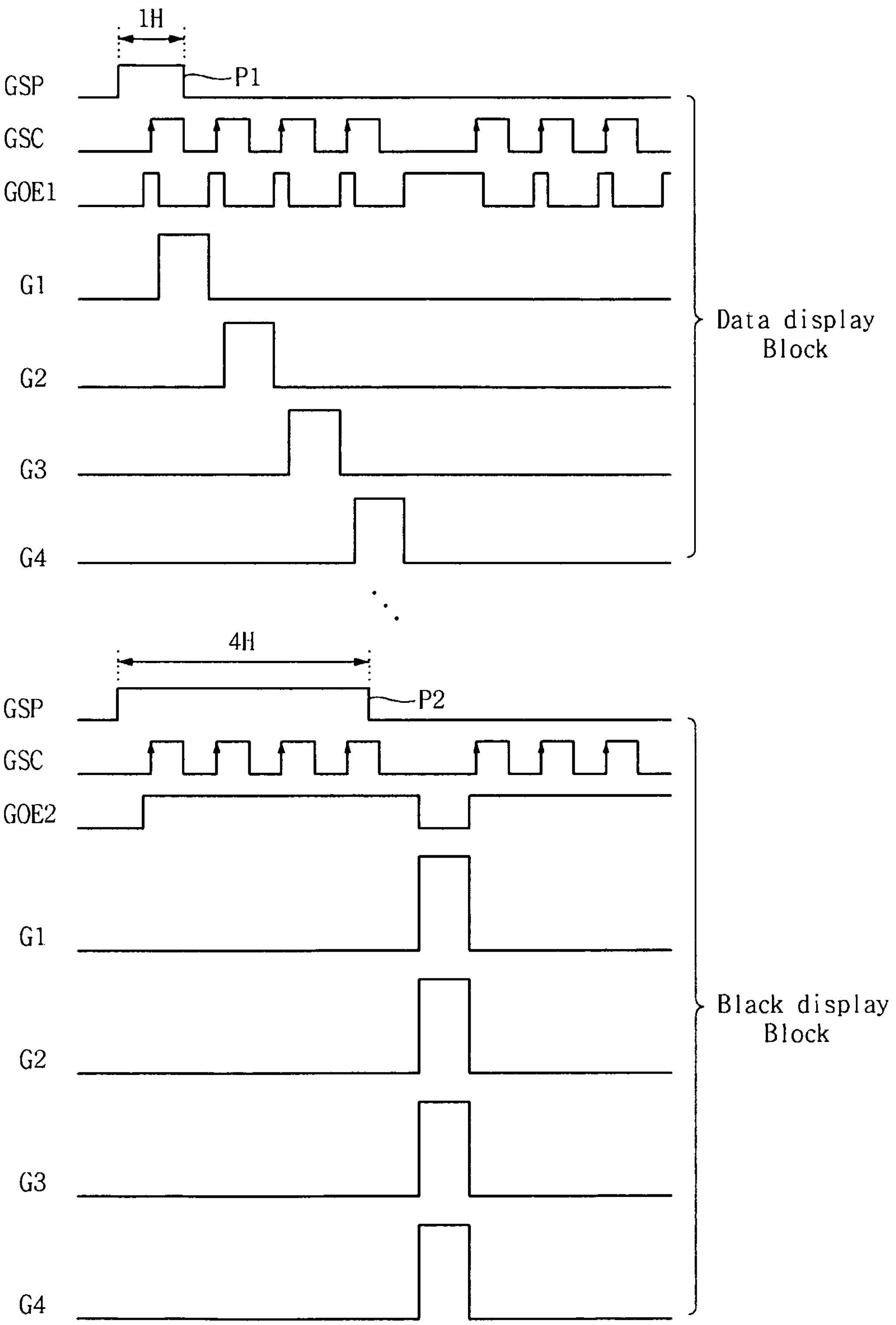
FIG. 10 is a waveform diagram showing in detail a gate timing control signal shown in FIG. 8 in a data write block and a black write block.

FIG. 9 is a waveform diagram showing the gate timing control signal shown in FIG. 8. As shown in FIG. 9, the gate start pulse GSP includes a first pulse P1 and a second pulse P2 in which delay between the pulses changes depending on changes in the black data insertion percentage.

A width of the first pulse P1 is approximately 1-horizontal period, and a width of the second pulse P2 is approximately N-horizontal period (where N is an integer equal to or larger than 2). The gate drive ICs 831 to 835 sequentially shift the first pulse P1 in response to the gate shift clock signal GSC. The blocks BL1 to BL5 start to be scanned by the gate drive ICs 831 to 835 that start to operate in response to the first pulse P1, and operate as the data write block. In the blocks BL1 to BL5 operating as the data write block, the gate pulses are sequentially applied to each of the gate lines.

The gate drive ICs 831 to 835 sequentially shift the second pulse P2 in response to the gate shift clock signal GSC. The blocks BL1 to BL5 start to be scanned by the gate drive ICs 831 to 835 that start to operate in response to the second pulse P2, and operate as the black insertion block. In the blocks BL1 to BL5 operating as the black insertion block, the gate pulses partially overlap each other depending on a relationship between the second pulse P2 with the wide width and the gate shift clock signal GSC generated in a cycle of about 1-horizontal period. For instance, in the blocks BL1 to BL5 operating as the black insertion block, a gate pulse applied to a k-th (where k is a positive integer) gate line and a gate pulse applied to a (k+1)-th gate line may partially overlap each other. Due to the gate output enable signals GOE1 to GOE5 independently applied to the gate drive ICs 831 to 835, N gate pulses are simultaneously applied to the black insertion blocks BL1 to BL5 sequential to N gate pulses sequentially applied to the data write blocks BL1 to BL5, and then the N gate pulses are sequentially applied to the data write blocks BL1 to BL5. The above-described operations repeat, and thus the gate drive ICs 831 to 835 scanning the data write block and the gate drive ICs 831 to 835 scanning the black insertion block alternately apply the gate pulses.

The gate output enable signals GOE1 to GOE5 are sequentially shifted. The gate output enable signals GOE1 to GOE5 each include a first period T1 during which ON and OFF operations of an output of the gate drive ICs 831 to 835 scanning a data write block are controlled, a second period T2 during which an output of the gate drive ICs 831 to 835 scanning a data hold block is cut off, and a third period T3 during which ON and OFF operations of a gate output of the gate drive ICs 831 to 835 scanning a black insertion block are controlled.

During the first period T1 of each of the gate output enable signals GOE1 to GOE5, the timing controller 81 generates pulses of the gate output enable signals GOE1 to GOE5 for each rising time of the gate start pulse GSC. During a low logic period between the pulses, the gate drive ICs 831 to 835 scanning the data write block generate gate pulses. Accordingly, during the first period T1, the gate drive ICs 831 to 835 scanning the data write block shift the gate start pulse GSP for each rising time of the gate shift clock signal GSC to sequentially apply the gate pulse to the gate lines. The gate drive ICs 831 to 835 supply the analog data voltage synchronized with the gate pulses applied to the data write block to the data lines. Accordingly, the liquid crystal cells of the data write block is charged to the analog data voltage.

During the second period T2 of each of the gate output enable signals GOE1 to GOE5, the timing controller 81 generates the gate output enable signals GOE1 to GOE5 in the form of a direct current (DC) voltage of a high logic. Accordingly, the gate drive ICs 831 to 835 scanning the data write block do not generate the gate pulse. During the second period T2, the gate drive ICs 831 to 835 output the analog data voltage to be written on another data write block, and the black gray scale voltage to be charged to the liquid crystal cells of the black write block.

During the third period T3 of each of the gate output enable signals GOE1 to GOE5, the timing controller 81 generate pulses of the gate output enable signals GOE1 to GOE5 with a width corresponding to about N-horizontal period (for example, 4-horizontal period in FIG. 10) in the gate drive ICs 831 to 835 scanning the black write block during the sequential application of the gate pulses to the 4 gate lines of the data write block. As a result, during the third period T3, the gate drive ICs 831 to 835 scanning the black write block do not output the gate pulse, and the gate pulses are sequentially applied to the gate lines of the data write block. While the gate drive ICs 831 to 835 scanning the black write block do not output the gate pulse during the third period T3, the shift registers inside the gate drive ICs 831 to 835 scanning the black write block shift the gate start pulse GSP of about 4-horizontal period to a next stage. The timing controller 81 holds the gate output enable signals GOE1 to GOE5 at a low logic voltage during about 1-horizontal period sequential to the pulses with the width corresponding to the 4-horizontal period. The gate drive ICs 831 to 835 scanning the black write block simultaneously output the gate pulses, which partially overlap each other and are shifted in the inside shift registers, to the 4 gate lines, and the data drive ICs simultaneously output the black gray scale voltages synchronized with the gate pulses.

FIGS. 11A to 11D are diagrams showing changes in a black data insertion percentage depending on a frame frequency. As shown in FIGS. 11A to 11D, in case that the 5 gate drive ICs 831 to 835 divide a display screen into 5 blocks BL1 to BL5 and division-drive the display screen, each of the blocks BL1 to BL5 are time division-driven during 5 sub-frame periods SF1 to SF5 of 1-frame period.

FIG. 11A shows the case where the 5 blocks BL1 to BL5 are driven at a black data insertion percentage of 20%. A first sub-frame period SF1 of an N-th frame period starts and at the same time, the timing controller 81 supplies the first pulse P1 of the gate start pulse GSP and the first period signal T1 of the first gate output enable signal GOE1 to the first gate drive IC 831 scanning the first block BL1. A time difference between the first and second pulses P1 and P2 of the gate start pulse GSP is approximately 4-subframe period. The gate start pulse GSP generated during an (N−1)-th frame period is shifted to the second gate drive IC 832 through the first gate drive IC 831. Accordingly, the first sub-frame period SF1 of the N-th frame period starts and at the same time, the second pulse P2 of the gate start pulse GSP and the third period signal T3 of the second gate output enable signal GOE2 are supplied to the second gate drive IC 832.

During the first sub-frame period SF1, while the first block BL1 is scanned by gate pulses sequentially generated in each of the lines depending on the first pulse P1 of the gate start pulse GSP and the first period signal T1 of the first gate output enable signal GOE1, the data drive ICs charge the analog data voltage to the first block BL1. While the second block BL2 is scanned by the gate pulses overlapping each other every the N lines depending on the second pulse P2 of the gate start pulse GSP and the third period signal T3 of the second gate output enable signal GOE2, the data drive ICs charge the black gray scale voltage to the second block BL2. The third block BL3 is held at the analog data voltage charged during the third sub-frame period SF3 of the (N−1)-th frame period depending on the second period signal T2 of the third gate output enable signal GOE3 cutting off an output of the gate pulse. The fourth block BL4 is held at the analog data voltage charged during the fourth sub-frame period SF4 of the (N−1)-th frame period depending on the second period signal T2 of the fourth gate output enable signal GOE4 cutting off an output of the gate pulse. The fifth block BL5 is held at the analog data voltage charged during the fifth sub-frame period SF5 of the (N−1)-th frame period depending on the second period signal T2 of the fifth gate output enable signal GOE5 cutting off an output of the gate pulse. Accordingly, during the first sub-frame period SF1, the first, third, fourth, and fifth blocks BL1, BL3, BL4, and BL5 operate as a data write block charged to or held at the data voltage, and the second block BL2 operates as a black write block charged to the black gray scale voltage.

During the second sub-frame period SF2, the first block BL1 is held at the analog data voltage charged during the first sub-frame period SF1 depending on the second period signal T2 of the first gate output enable signal GOE1 cutting off an output of the gate pulse. While the second block BL2 is scanned by gate pulses sequentially generated in each of the lines depending on the first pulse P1 of the gate start pulse GSP and the first period signal T1 of the second gate output enable signal GOE2, the data drive ICs charge the analog data voltage to the second block BL2. While the third block BL3 is scanned by the gate pulses overlapping each other every the N lines depending on the second pulse P2 of the gate start pulse GSP and the third period signal T3 of the third gate output enable signal GOE3, the data drive ICs charge the black gray scale voltage to the third block BL3. The fourth block BL4 is held at the analog data voltage charged during the fourth sub-frame period SF4 of the (N−1)-th frame period depending on the second period signal T2 of the fourth gate output enable signal GOE4 cutting off an output of the gate pulse. The fifth block BL5 is held at the analog data voltage charged during the fifth sub-frame period SF5 of the (N−1)-th frame period depending on the second period signal T2 of the fifth gate output enable signal GOE5 cutting off an output of the gate pulse. Accordingly, during the second sub-frame period SF2, the first, second, fourth, and fifth blocks BL1, BL2, BL4, and BL5 operate as a data write block charged to or held at the data voltage, and the third block BL3 operates as a black write block charged to the black gray scale voltage.

During the third sub-frame period SF3, the first block BL1 is held at the analog data voltage charged during the first sub-frame period SF1 depending on the second period signal T2 of the first gate output enable signal GOE1 cutting off an output of the gate pulse. The second block BL2 is held at the analog data voltage charged during the second sub-frame period SF2 depending on the second period signal T2 of the second gate output enable signal GOE2 cutting off an output of the gate pulse. While the third block BL3 is scanned by gate pulses sequentially generated in each of the lines depending on the first pulse P1 of the gate start pulse GSP and the first period signal T1 of the third gate output enable signal GOE3, the data drive ICs charge the analog data voltage to the third block BL3. While the fourth block BL4 is scanned by the gate pulses overlapping each other every the N lines depending on the second pulse P2 of the gate start pulse GSP and the third period signal T3 of the fourth gate output enable signal GOE4, the data drive ICs charge the black gray scale voltage to the fourth block BL4. The fifth block BL5 is held at the analog data voltage charged during the fifth sub-frame period SF5 of the (N−1)-th frame period depending on the second period signal T2 of the fifth gate output enable signal GOE5 cutting off an output of the gate pulse. Accordingly, during the third sub-frame period SF3, the first, second, third, and fifth blocks BL1, BL2, BL3, and BL5 operate as a data write block charged to or held at the data voltage, and the fourth block BL4 operates as a black write block charged to the black gray scale voltage.

During the fourth sub-frame period SF4, the first block BL1 is held at the analog data voltage charged during the first sub-frame period SF1 depending on the second period signal T2 of the first gate output enable signal GOE1 cutting off an output of the gate pulse. The second block BL2 is held at the analog data voltage charged during the second sub-frame period SF2 depending on the second period signal T2 of the second gate output enable signal GOE2 cutting off an output of the gate pulse. The third block BL3 is held at the analog data voltage charged during the third sub-frame period SF3 depending on the second period signal T2 of the third gate output enable signal GOE3 cutting off an output of the gate pulse. While the fourth block BL4 is scanned by gate pulses sequentially generated in each of the lines depending on the first pulse P1 of the gate start pulse GSP and the first period signal T1 of the fourth gate output enable signal GOE4, the data drive ICs charge the analog data voltage to the fourth block BL4. While the fifth block BL5 is scanned by the gate pulses overlapping each other every the N lines depending on the second pulse P2 of the gate start pulse GSP and the third period signal T3 of the fifth gate output enable signal GOE5, the data drive ICs charge the black gray scale voltage to the fifth block BL5. Accordingly, during the fourth sub-frame period SF4, the first to fourth blocks BL1 to BL4 operate as a data write block charged to or held at the data voltage, and the fifth block BL5 operates as a black write block charged to the black gray scale voltage.

During the fifth sub-frame period SF5, while the first block BL1 is scanned by the gate pulses overlapping each other every the N lines depending on the second pulse P2 of the gate start pulse GSP and the third period signal T3 of the first gate output enable signal GOE1, the data drive ICs charge the black gray scale voltage to the first block BL1. The second block BL2 is held at the analog data voltage charged during the second sub-frame period SF2 depending on the second period signal T2 of the second gate output enable signal GOE2 cutting off an output of the gate pulse. The third block BL3 is held at the analog data voltage charged during the third sub-frame period SF3 depending on the second period signal T2 of the third gate output enable signal GOE3 cutting off an output of the gate pulse. The fourth block BL4 is held at the analog data voltage charged during the fourth sub-frame period SF4 depending on the second period signal T2 of the fourth gate output enable signal GOE4 cutting off an output of the gate pulse. While the fifth block BL5 is scanned by gate pulses sequentially generated in each of the lines depending on the first pulse P1 of the gate start pulse GSP and the first period signal T1 of the fifth gate output enable signal GOE5, the data drive ICs charge the analog data voltage to the fifth block BL5. Accordingly, during the fifth sub-frame period SF5, the second to fifth blocks BL2 to BL5 operate as a data write block charged to or held at the data voltage, and the first block BL1 operates as a black write block charged to the black gray scale voltage.

A waveform of FIG. 9 indicates a gate timing control signal applied when each of the blocks BL1 to BL5 operates in the drive manner shown in FIG. 11A. Each of the blocks BL1 to BL5 is charged to the black gray scale voltage during a period of time corresponding to ⅕ of 1 frame period depending on the gate timing control signal of FIGS. 9 and 11A generated by the timing controller 81. In other words, the blocks BL1 to BL5 shown in FIG. 11A are driven at the black data insertion percentage of 20%.

FIG. 11B shows the case where the blocks BL1 to BL5 are driven at a black data insertion percentage of 40%. As shown in FIG. 11B, the first sub-frame period SF1 of the N-th frame period starts and at the same time, the timing controller 81 supplies the first pulse P1 of the gate start pulse GSP and the first period signal T1 of the first gate output enable signal GOE1 to the first gate drive IC 831 scanning the first block BL1. A time difference between the first and second pulses P1 and P2 of the gate start pulse GSP is approximately 3-sub-frame period. The gate start pulse GSP generated during the (N−1)-th frame period is shifted to the third gate drive IC 833 through the first and second gate drive ICs 831 and 832. Accordingly, the first sub-frame period SF1 of the N-th frame period starts and at the same time, the second pulse P2 of the gate start pulse GSP and the third period signal T3 of the third gate output enable signal GOE3 are supplied to the third gate drive IC 833.

During the first sub-frame period SF1, while the first block BL1 is scanned by gate pulses sequentially generated in each of the lines depending on the first pulse P1 of the gate start pulse GSP and the first period signal T1 of the first gate output enable signal GOE1, the data drive ICs charge the analog data voltage to the first block BL1. During the first sub-frame period SF1, the second gate output enable signal GOE2 is applied to the second gate drive IC 832 in the form of a DC voltage of a high logic hold like a second period signal T2. Accordingly, the second block BL2 is held at the black gray scale voltage charged during the fifth sub-frame period SF5 of the (N−1)-th frame period depending on the second gate output enable signal GOE2 of the DC voltage form of the high logic hold. While the third block BL3 is scanned by the gate pulses overlapping each other every the N lines depending on the second pulse P2 of the gate start pulse GSP and the third period signal T3 of the third gate output enable signal GOE3, the data drive ICs charge the black gray scale voltage to the third block BL3. The fourth block BL4 is held at the analog data voltage charged during the fourth sub-frame period SF4 of the (N−1)-th frame period depending on the second period signal T2 of the fourth gate output enable signal GOE4 cutting off an output of the gate pulse. The fifth block BL5 is held at the analog data voltage charged during the fifth sub-frame period SF5 of the (N−1)-th frame period depending on the second period signal T2 of the fifth gate output enable signal GOE5 cutting off an output of the gate pulse. Accordingly, during the first sub-frame period SF1, the first, fourth, and fifth blocks BL1, BL4, and BL5 operate as a data write block charged to or held at the data voltage, and the second and third blocks BL2 and BL3 operate as a black write block charged to or held at the black gray scale voltage.

During the second sub-frame period SF2, the first block BL1 is held at the analog data voltage charged during the first sub-frame period SF1 depending on the second period signal T2 of the first gate output enable signal GOE1 cutting off an output of the gate pulse. While the second block BL2 is scanned by gate pulses sequentially generated in each of the lines depending on the first pulse P1 of the gate start pulse GSP and the first period signal T1 of the second gate output enable signal GOE2, the data drive ICs charge the analog data voltage to the second block BL2. During the second sub-frame period SF2, the third gate output enable signal GOE3 is applied to the third gate drive IC 833 in the form of a DC voltage of a high logic hold like the second period signal T2. Accordingly, the third block BL3 is held at the black gray scale voltage charged during the first sub-frame period SF1 depending on the DC third gate output enable signal GOE3 of a high logic hold. While the fourth block BL4 is scanned by the gate pulses overlapping each other every the N lines depending on the second pulse P2 of the gate start pulse GSP and the third period signal T3 of the fourth gate output enable signal GOE4, the data drive ICs charge the black gray scale voltage to the fourth block BL4. The fifth block BL5 is held at the analog data voltage charged during the fifth sub-frame period SF5 of the (N−1)-th frame period depending on the second period signal T2 of the fifth gate output enable signal GOE5 cutting off an output of the gate pulse. Accordingly, during the second sub-frame period SF2, the first, second, and fifth blocks BL1, BL2, and BL5 operate as a data write block charged to or held at the data voltage, and the third and fourth blocks BL3 and BL4 operate as a black write block charged to or held at the black gray scale voltage.

During the third sub-frame period SF3, the first block BL1 is held at the analog data voltage charged during the first sub-frame period SF1 depending on the second period signal T2 of the first gate output enable signal GOE1 cutting off an output of the gate pulse. The second block BL2 is held at the analog data voltage charged during the second sub-frame period SF2 depending on the second period signal T2 of the second gate output enable signal GOE2 cutting off an output of the gate pulse. While the third block BL3 is scanned by gate pulses sequentially generated in each of the lines depending on the first pulse P1 of the gate start pulse GSP and the first period signal T1 of the third gate output enable signal GOE3, the data drive ICs charge the analog data voltage to the third block BL3. During the third sub-frame period SF3, the fourth gate output enable signal GOE4 is applied to the fourth gate drive IC 834 in the form of a DC voltage of a high logic hold like the second period signal T2. Accordingly, the fourth block BL4 is held at the black gray scale voltage charged during the second sub-frame period SF2 depending on the DC fourth gate output enable signal GOE4 of a high logic hold. While the fifth block BL5 is scanned by the gate pulses overlapping each other every the N lines depending on the second pulse P2 of the gate start pulse GSP and the third period signal T3 of the fifth gate output enable signal GOE5, the data drive ICs charge the black gray scale voltage to the fifth block BL5. Accordingly, during the third sub-frame period SF3, the first to third blocks BL1 to BL3 operate as a data write block charged to or held at the data voltage, and the fourth and fifth blocks BL4 and BL5 operate as a black write block charged to or held at the black gray scale voltage.

During the fourth sub-frame period SF4, while the first block BL1 is scanned by the gate pulses overlapping each other every the N lines depending on the second pulse P2 of the gate start pulse GSP and the third period signal T3 of the first gate output enable signal GOE1, the data drive ICs charge the black gray scale voltage to the first block BL1. The second block BL2 is held at the analog data voltage charged during the second sub-frame period SF2 depending on the second period signal T2 of the second gate output enable signal GOE2 cutting off an output of the gate pulse. The third block BL3 is held at the analog data voltage charged during the third sub-frame period SF3 depending on the second period signal T2 of the third gate output enable signal GOE3 cutting off an output of the gate pulse. While the fourth block BL4 is scanned by gate pulses sequentially generated in each of the lines depending on the first pulse P1 of the gate start pulse GSP and the first period signal T1 of the fourth gate output enable signal GOE4, the data drive ICs charge the analog data voltage to the fourth block BL4. During the fourth sub-frame period SF4, the fifth gate output enable signal GOE5 is applied to the fifth gate drive IC 835 in the form of a DC voltage of a high logic hold like the second period signal T2. Accordingly, the fifth block BL5 is held at the black gray scale voltage charged during the third sub-frame period SF3 depending on the DC fifth gate output enable signal GOE5 of a high logic hold. Accordingly, during the fourth sub-frame period SF4, the second to fourth blocks BL2 to BL4 operate as a data write block charged to or held at the data voltage, and the first and fifth blocks BL1 and BL5 operate as a black write block charged to or held at the black gray scale voltage.

During the fifth sub-frame period SF5, the first gate output enable signal GOE1 is applied to the first gate drive IC 831 in the form of a DC voltage of a high logic hold like the second period signal T2. Accordingly, the first block BL1 is held at the black gray scale voltage charged during the fourth sub-frame period SF4 depending on the DC first gate output enable signal GOE1 of a high logic hold. While the second block BL2 is scanned by the gate pulses overlapping each other every the N lines depending on the second pulse P2 of the gate start pulse GSP and the third period signal T3 of the second gate output enable signal GOE2, the data drive ICs charge the black gray scale voltage to the second block BL2. The third block BL3 is held at the analog data voltage charged during the third sub-frame period SF3 depending on the second period signal T2 of the third gate output enable signal GOE3 cutting off an output of the gate pulse. The fourth block BL4 is held at the analog data voltage charged during the fourth sub-frame period SF4 depending on the second period signal T2 of the fourth gate output enable signal GOE4 cutting off an output of the gate pulse. While the fifth block BL5 is scanned by gate pulses sequentially generated in each of the lines depending on the first pulse P1 of the gate start pulse GSP and the first period signal T1 of the fifth gate output enable signal GOE5, the data drive ICs charge the analog data voltage to the fifth block BL5. Accordingly, during the fifth sub-frame period SF5, the third to fifth blocks BL3 to BL5 operate as a data write block charged to or held at the data voltage, and the first and second blocks BL1 and BL2 operate as a black write block charged to or held at the black gray scale voltage.

To drive the blocks BL1 to BL5 in the drive manner shown in FIG. 11B, the timing controller 81 causes a delay value of the second pulse P2 of the gate start pulse GSP in FIG. 11B to be smaller than a delay value of the second pulse P2 of the gate start pulse GSP in the waveform of FIG. 9. Further, the timing controller 81 has to allot a high logic voltage period for black hold during the remaining period (i.e., during a period between the third period signal T3 and the first period signal T1 in the gate output enable signals GOE1 to GOE5) obtained by reducing the delay value of the second pulse P2 of the gate start pulse GSP. Each of the blocks BL1 to BL5 shown in FIG. 11B is charged to the black gray scale voltage during a period corresponding to ⅖ of the 1 frame period depending on the gate timing control signal of which timing is controlled by the timing controller 81. In other words, the blocks BL1 to BL5 shown in FIG. 11B are driven at a black data insertion percentage of 40%.

FIG. 11C shows the case where the blocks BL1 to BL5 are driven at a black data insertion percentage of 60%. As shown in FIG. 11C, the first sub-frame period SF1 of the N-th frame period starts and at the same time, the timing controller 81 supplies the first pulse P1 of the gate start pulse GSP and the first period signal T1 of the first gate output enable signal GOE1 to the first gate drive IC 831 scanning the first block BL1. A time difference between the first and second pulses P1 and P2 of the gate start pulse GSP is approximately 2-sub-frame period. The gate start pulse GSP generated during the (N−1)-th frame period is shifted to the fourth gate drive IC 834 through the first to third gate drive ICs 831 to 833. Accordingly, the first sub-frame period SF1 of the N-th frame period starts and at the same time, the second pulse P2 of the gate start pulse GSP and the third period signal T3 of the fourth gate output enable signal GOE4 are supplied to the fourth gate drive IC 834.

During the first sub-frame period SF1, while the first block BL1 is scanned by gate pulses sequentially generated in each of the lines depending on the first pulse P1 of the gate start pulse GSP and the first period signal T1 of the first gate output enable signal GOE1, the data drive ICs charge the analog data voltage to the first block BL1. The second gate output enable signal GOE2 is held at a high logic voltage like the second period signal T2 during a period of time ranging from a start of the fifth sub-frame period SF5 of the (N−1)-th frame period to an end of the first sub-frame period SF1 of the N-th frame period. The first sub-frame period SF1 starts and at the same time, the third gate output enable signal GOE3 is generated in the form of a high logic voltage. The third gate output enable signal GOE3 is held at the high logic voltage until the second sub-frame period SF2 ends. Accordingly, during the first sub-frame period SF1, the second block BL2 is held at the black gray scale voltage charged during the fourth sub-frame period SF4 of the (N−1)-th frame period depending on the second gate output enable signal GOE2. The third block BL3 is held at the black gray scale voltage charged during the fifth sub-frame period SF5 of the (N−1)-th frame period depending on the third gate output enable signal GOE3. While the fourth block BL4 is scanned by the gate pulses overlapping each other every the N lines depending on the second pulse P2 of the gate start pulse GSP and the third period signal T3 of the fourth gate output enable signal GOE4, the data drive ICs charge the black gray scale voltage to the fourth block BL4. The fifth block BL5 is held at the analog data voltage charged during the fifth sub-frame period SF5 of the (N−1)-th frame period depending on the second period signal T2 of the fifth gate output enable signal GOE5 cutting off an output of the gate pulse. Accordingly, during the first sub-frame period SF1, the first and fifth blocks BL1 and BL5 operate as a data write block charged to or held at the data voltage, and the second, third, and fourth blocks BL2, BL3, and BL4 operate as a black write block charged to or held at the black gray scale voltage.

During the second sub-frame period SF2, the first block BL1 is held at the analog data voltage charged during the first sub-frame period SF1 depending on the second period signal T2 of the first gate output enable signal GOE1 cutting off an output of the gate pulse. While the second block BL2 is scanned by gate pulses sequentially generated in each of the lines depending on the first pulse P1 of the gate start pulse GSP and the first period signal T1 of the second gate output enable signal GOE2, the data drive ICs charge the analog data voltage to the second block BL2. The third gate output enable signal GOE3 is held at a high logic voltage like the second period signal T2 during a period of time ranging from a start of the first sub-frame period SF1 to an end of the second sub-frame period SF2. The fourth gate output enable signal GOE4 is held at a high logic voltage like the second period signal T2 during a period of time ranging from a start of the second sub-frame period SF2 to an end of the third sub-frame period SF3. Accordingly, during the second sub-frame period SF2, the third block BL3 is held at the black gray scale voltage charged during the fifth sub-frame period SF5 of the (N−1)-th frame period depending on the third gate output enable signal GOE3. The fourth block BL4 is held at the black gray scale voltage charged during the first sub-frame period SF1 depending on the fourth gate output enable signal GOE4. While the fifth block BL5 is scanned by the gate pulses overlapping each other every the N lines depending on the second pulse P2 of the gate start pulse GSP and the third period signal T3 of the fifth gate output enable signal GOE5, the data drive ICs charge the black gray scale voltage to the fifth block BL5. Accordingly, during the second sub-frame period SF2, the first and second blocks BL1 and BL2 operate as a data write block charged to or held at the data voltage, and the third to fifth blocks BL3 to BL5 operate as a black write block charged to or held at the black gray scale voltage.

During the third sub-frame period SF3, while the first block BL1 is scanned by the gate pulses overlapping each other every the N lines depending on the second pulse P2 of the gate start pulse GSP and the third period signal T3 of the first gate output enable signal GOE1, the data drive ICs charge the black gray scale voltage to the first block BL1. The second block BL2 is held at the analog data voltage charged during the second sub-frame period SF2 depending on the second period signal T2 of the second gate output enable signal GOE2 cutting off an output of the gate pulse. While the third block BL3 is scanned by gate pulses sequentially generated in each of the lines depending on the first pulse P1 of the gate start pulse GSP and the first period signal T1 of the third gate output enable signal GOE3, the data drive ICs charge the analog data voltage to the third block BL3. While the fourth block BL4 is scanned by the gate pulses overlapping each other every the N lines depending on the second pulse P2 of the gate start pulse GSP and the third period signal T3 of the fourth gate output enable signal GOE4, the data drive ICs charge the black gray scale voltage to the fourth block BL4. The fifth block BL5 is held at the black gray scale voltage charged during the second sub-frame period SF2 depending on the fifth gate output enable signal GOES. Accordingly, during the third sub-frame period SF1, the second and third blocks BL2 and BL3 operate as a data write block charged to or held at the data voltage, and the first, fourth, and fifth blocks BL1, BL4, and BL5 operate as a black write block charged to or held at the black gray scale voltage.

The first gate output enable signal GOE1 is held at a high logic voltage during a period of time ranging from a start of the fourth sub-frame period SF4 to an end of the fifth sub-frame period SF5. Accordingly, the first block BL1 is held at the black gray scale voltage charged during the third sub-frame period SF3 depending on the first gate output enable signal GOE1, which is held at the high logic voltage, during the fourth sub-frame period SF4. While the second block BL2 is scanned by the gate pulses overlapping each other every the N lines depending on the second pulse P2 of the gate start pulse GSP and the third period signal T3 of the second gate output enable signal GOE2, the data drive ICs charge the black gray scale voltage to the second block BL2. The third block BL3 is held at the analog data voltage charged during the third sub-frame period SF3 depending on the second period signal T2 of the third gate output enable signal GOE3 cutting off an output of the gate pulse. While the fourth block BL4 is scanned by gate pulses sequentially generated in each of the lines depending on the first pulse P1 of the gate start pulse GSP and the first period signal T1 of the fourth gate output enable signal GOE4, the data drive ICs charge the analog data voltage to the fourth block BL4. While the fifth block BL5 is scanned by the gate pulses overlapping each other every the N lines depending on the second pulse P2 of the gate start pulse GSP and the third period signal T3 of the fifth gate output enable signal GOE5, the data drive ICs charge the black gray scale voltage to the fifth block BL5. Accordingly, during the fourth sub-frame period SF4, the third and fourth blocks BL3 and BL4 operate as a data write block charged to or held at the data voltage, and the first, second, and fifth blocks BL1, BL2, and BL5 operate as a black write block charged to or held at the black gray scale voltage.

The first gate output enable signal GOE1 is held at a high logic voltage during a period of time ranging from a start of the fourth sub-frame period SF4 to an end of the fifth sub-frame period SF5. The second gate output enable signal GOE2 is held at a high logic voltage during a period of time ranging from a start of the fifth sub-frame period SF5 to an end of a first sub-frame period SF1 of an (N+1)-th frame period. Accordingly, the first block BL1 is held at the black gray scale voltage charged during the third sub-frame period SF3 depending on the first gate output enable signal GOE1, which is held at the high logic voltage, during the fifth sub-frame period SF5, and the second block BL2 is held at the black gray scale voltage charged during the fourth sub-frame period SF4 depending on the second gate output enable signal GOE2, which is held at the high logic voltage, during the fifth sub-frame period SF5. While the third block BL3 is scanned by the gate pulses overlapping each other every the N lines depending on the second pulse P2 of the gate start pulse GSP and the third period signal T3 of the third gate output enable signal GOE3, the data drive ICs charge the black gray scale voltage to the third block BL3. The fourth block BL4 is held at the analog data voltage charged during the fourth sub-frame period SF4 depending on the second period signal T2 of the fourth gate output enable signal GOE4 cutting off an output of the gate pulse. While the fifth block BL5 is scanned by gate pulses sequentially generated in each of the lines depending on the first pulse P1 of the gate start pulse GSP and the first period signal T1 of the fifth gate output enable signal GOE5, the data drive ICs charge the analog data voltage to the fifth block BL5. Accordingly, during the fifth sub-frame period SF5, the fourth and fifth blocks BL4 and BL5 operate as a data write block charged to or held at the data voltage, and the first to third blocks BL1 to BL3 operate as a black write block charged to or held at the black gray scale voltage.

To drive the blocks BL1 to BL5 in the drive manner shown in FIG. 11C, the timing controller 81 causes a delay value of the second pulse P2 of the gate start pulse GSP in FIG. 11C to be smaller than a delay value of the second pulse P2 of the gate start pulse GSP in the waveform generated in the drive manner of FIG. 11B. Further, the timing controller 81 has to allot a high logic voltage period for black hold during the remaining period (i.e., during a period between the third period signal T3 and the first period signal T1 in the gate output enable signals GOE1 to GOE5) obtained by reducing the delay value of the second pulse P2 of the gate start pulse GSP. Each of the blocks BL1 to BL5 shown in FIG. 11C is charged to the black gray scale voltage during a period corresponding to ⅗ of the 1 frame period depending on the gate timing control signal of which timing is controlled by the timing controller 81. In other words, the blocks BL1 to BL5 shown in FIG. 11C are driven at a black data insertion percentage of 60%.

FIG. 11D shows the case where the blocks BL1 to BL5 are driven at a black data insertion percentage of 80%. As shown in FIG. 11D, the first sub-frame period SF1 of the N-th frame period starts and at the same time, the timing controller 81 supplies the first pulse P1 of the gate start pulse GSP and the first period signal T1 of the first gate output enable signal GOE1 to the first gate drive IC 831 scanning the first block BL1. A time difference between the first and second pulses P1 and P2 of the gate start pulse GSP is approximately 1-sub-frame period. The gate start pulse GSP generated during the (N−1)-th frame period is shifted to the fifth gate drive IC 835 through the first to fourth gate drive ICs 831 to 834. Accordingly, the first sub-frame period SF1 of the N-th frame period starts and at the same time, the second pulse P2 of the gate start pulse GSP and the third period signal T3 of the fifth gate output enable signal GOE5 are supplied to the fifth gate drive IC 835.

During the first sub-frame period SF1, while the first block BL1 is scanned by gate pulses sequentially generated in each of the lines depending on the first pulse P1 of the gate start pulse GSP and the first period signal T1 of the first gate output enable signal GOE1, the data drive ICs charge the analog data voltage to the first block BL1. The second gate output enable signal GOE2 is held at a high logic voltage during a period of time ranging from a start of the fourth sub-frame period SF4 of the (N−1)-th frame period to an end of the first sub-frame period SF1 of the N-th frame period. The third gate output enable signal GOE3 is held at a high logic voltage during a period of time ranging from a start of the fifth sub-frame period SF5 of the (N−1)-th frame period to an end of the second sub-frame period SF2 of the N-th frame period. The fourth gate output enable signal GOE4 is held at a high logic voltage during a period of time ranging from a start of the first sub-frame period SF1 to an end of the third sub-frame period SF3. Accordingly, during the first sub-frame period SF1, the second block BL2 is held at the black gray scale voltage charged during the third sub-frame period SF3 of the (N−1)-th frame period depending on the second gate output enable signal GOE2. The third block BL3 is held at the black gray scale voltage charged during the fourth sub-frame period SF4 of the (N−1)-th frame period depending on the third gate output enable signal GOE3. The fourth block BL4 is held at the black gray scale voltage charged during the fifth sub-frame period SF5 of the (N−1)-th frame period depending on the fourth gate output enable signal GOE4. While the fifth block BL5 is scanned by the gate pulses overlapping each other every the N lines depending on the second pulse P2 of the gate start pulse GSP and the third period signal T3 of the fifth output enable signal GOE5, the data drive ICs charge the black gray scale voltage to the fifth block BL5. Accordingly, during the first sub-frame period SF1, the first block BL1 operates as a data write block charged to the data voltage, and the second to fifth blocks BL2 to BL5 operate as a black write block charged to or held at the black gray scale voltage.

During the second sub-frame period SF2, while the first block BL1 is scanned by the gate pulses overlapping each other every the N lines depending on the second pulse P2 of the gate start pulse GSP and the third period signal T3 of the first gate output enable signal GOE1, the data drive ICs charge the black gray scale voltage to the first block BL1. While the second block BL2 is scanned by gate pulses sequentially generated in each of the lines depending on the first pulse P1 of the gate start pulse GSP and the first period signal T1 of the second gate output enable signal GOE2, the data drive ICs charge the analog data voltage to the second block BL2. The third block BL3 is held at the black gray scale voltage charged during the fourth sub-frame period SF4 of the (N−1)-th frame period depending on the third gate output enable signal GOE3 which is held at a high logic voltage. The fourth block BL4 is held at the black gray scale voltage charged during the fifth sub-frame period SF5 of the (N−1)-th frame period depending on the fourth gate output enable signal GOE4. The fifth gate output enable signal GOE5 is held at a high logic voltage during a period of time ranging from a start of the second sub-frame period SF2 to an end of the fourth sub-frame period SF4. Accordingly, the fifth block BL5 is held at the black gray scale voltage charged during the first sub-frame period SF1 depending on the fifth gate output enable signal GOE5 which is held at the high logic voltage. Accordingly, during the second sub-frame period SF2, the second block BL2 operates as a data write block charged to the data voltage, and the first, third, fourth, and fifth blocks BL1, BL3, BL4, and BL5 operate as a black write block charged to or held at the black gray scale voltage.

The first gate output enable signal GOE1 is held at a high logic voltage during a period of time ranging from a start of the third sub-frame period SF3 to an end of the fifth sub-frame period SF5. Accordingly, the first block BL1 is held at the black gray scale voltage charged during the second sub-frame period SF24 depending on the first gate output enable signal GOE1 during the third sub-frame period SF3. While the second block BL2 is scanned by the gate pulses overlapping each other every the N lines depending on the second pulse P2 of the gate start pulse GSP and the third period signal T3 of the second gate output enable signal GOE2, the data drive ICs charge the black gray scale voltage to the second block BL2. While the third block BL3 is scanned by gate pulses sequentially generated in each of the lines depending on the first pulse P1 of the gate start pulse GSP and the first period signal T1 of the third gate output enable signal GOE3, the data drive ICs charge the analog data voltage to the third block BL3. The fourth block BL4 is held at the black gray scale voltage charged during the fifth sub-frame period SF5 of the (N−1)-th frame period depending on the fourth gate output enable signal GOE4 which is held at the high logic voltage. The fifth block BL5 is held at the black gray scale voltage charged during the first sub-frame period SF1 depending on the fifth gate output enable signal GOE5 which is held at the high logic voltage. Accordingly, during the third sub-frame period SF3, the third block BL3 operates as a data write block charged to the data voltage, and the first, second, fourth, and fifth blocks BL1, BL2, BL4, and BL5 operate as a black write block charged to or held at the black gray scale voltage.

During the fourth sub-frame period SF4, the first block BL1 is held at the black gray scale voltage charged during the second sub-frame period SF2 depending on the first gate output enable signal GOE1 which is held at the high logic voltage. The second gate output enable signal GOE2 is held at a high logic voltage during a period of time ranging from a start of the fourth sub-frame period SF4 to an end of the first sub-frame period SF1 of the (N+1)-th frame period. Accordingly, the second block BL2 is held at the black gray scale voltage charged during the third sub-frame period SF3 depending on the second gate output enable signal GOE2 during the fourth sub-frame period SF4. While the third block BL3 is scanned by the gate pulses overlapping each other every the N lines depending on the second pulse P2 of the gate start pulse GSP and the third period signal T3 of the third gate output enable signal GOE3, the data drive ICs charge the black gray scale voltage to the third block BL3. While the fourth block BL4 is scanned by gate pulses sequentially generated in each of the lines depending on the first pulse P1 of the gate start pulse GSP and the first period signal T1 of the fourth gate output enable signal GOE4, the data drive ICs charge the analog data voltage to the fourth block BL4. The fifth block BL5 is held at the black gray scale voltage charged during the first sub-frame period SF1 depending on the fifth gate output enable signal GOE5 which is held at the high logic voltage. Accordingly, during the fourth sub-frame period SF4, the fourth block BL4 operates as a data write block charged to the data voltage, and the first, second, third, and fifth blocks BL1, BL2, BL3, and BL5 operate as a black write block charged to or held at the black gray scale voltage.

During the fifth sub-frame period SF5, the first block BL1 is held at the black gray scale voltage charged during the second sub-frame period SF2 depending on the first gate output enable signal GOE1 which is held at the high logic voltage. The second block BL2 is held at the black gray scale voltage charged during the third sub-frame period SF31 depending on the second gate output enable signal GOE2 which is held at the high logic voltage. The third gate output enable signal GOE3 is held at a high logic voltage during a period of time ranging from a start of the fifth sub-frame period SF5 to an end of the second sub-frame period SF2 of the (N+1)-th frame period. The third block BL3 is held at the black gray scale voltage charged during the fourth sub-frame period SF4 depending on the third gate output enable signal GOE3. While the fourth block BL4 is scanned by the gate pulses overlapping each other every the N lines depending on the second pulse P2 of the gate start pulse GSP and the third period signal T3 of the fourth gate output enable signal GOE4, the data drive ICs charge the black gray scale voltage to the fourth block BL4. While the fifth block BL5 is scanned by gate pulses sequentially generated in each of the lines depending on the first pulse P1 of the gate start pulse GSP and the first period signal T1 of the fifth gate output enable signal GOE5, the data drive ICs charge the analog data voltage to the fifth block BL5. Accordingly, during the fifth sub-frame period SF5, the fifth block BL5 operates as a data write block charged to the data voltage, and the first to fourth blocks BL1 to BL4 operate as a black write block charged to or held at the black gray scale voltage.

To drive the blocks BL1 to BL5 in the drive manner shown in FIG. 11D, the timing controller 81 causes a delay value of the second pulse P2 of the gate start pulse GSP in FIG. 11D to be smaller than a delay value of the second pulse P2 of the gate start pulse GSP in the waveform generated in the drive manner of FIG. 11C. Further, the timing controller 81 has to allot a high logic voltage period for black hold during the remaining period (i.e., during a period between the third period signal T3 and the first period signal T1 in the gate output enable signals GOE1 to GOE5) obtained by reducing the delay value of the second pulse P2 of the gate start pulse GSP. Each of the blocks BL1 to BL5 shown in FIG. 11D is charged to the black gray scale voltage during a period corresponding to ⅘ of the 1 frame period depending on the gate timing control signal of which timing is controlled by the timing controller 81. In other words, the blocks BL1 to BL5 shown in FIG. 11D are driven at a black data insertion percentage of 80%.

Although FIGS. 11A to 11D have illustrated and described the drive of the blocks BL1 to BL5 when the black data insertion percentage changes to 20%, 40%, 60%, and 80%, the exemplary embodiment is not limited to the above range of the black data insertion percentage. For instance, the exemplary embodiment may adjust the black data insertion percentage in the same way as FIG. 7 by increasing the number of data drive ICs and controlling the timing of the gate timing control signal by the timing controller 81.

Figure 12:
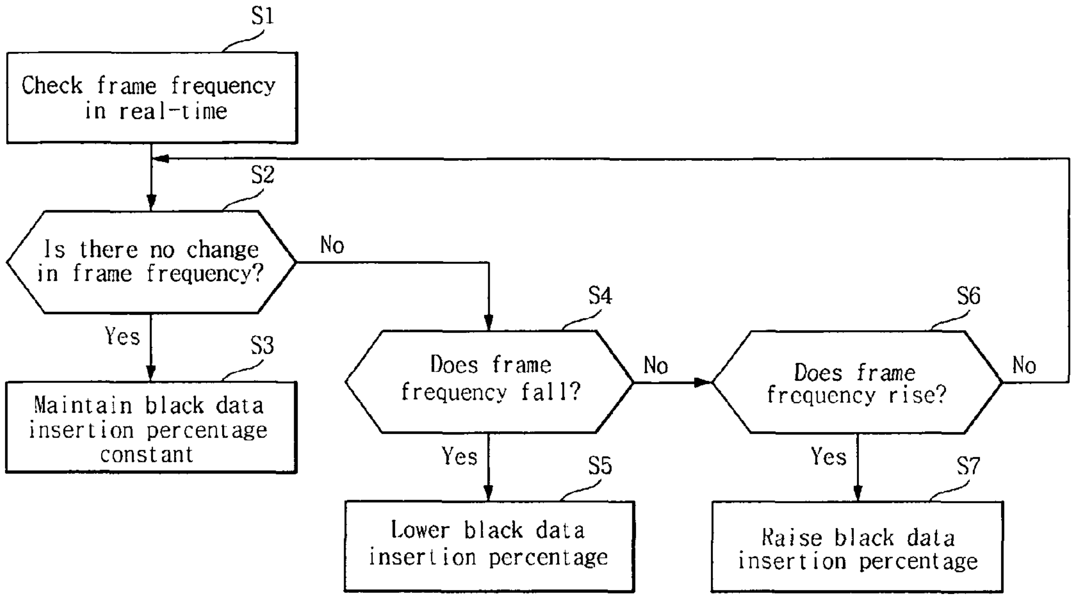
FIG. 12 is a flow chart sequentially showing a method of driving the liquid crystal display according to the exemplary embodiment.

FIG. 12 is a flow chart sequentially showing a method of driving the liquid crystal display according to an exemplary embodiment. As shown in FIG. 12, the timing controller 81 counts the vertical sync signal Vsync based on the fixed clock signal FCLK to check a frame frequency in real-time in step S1.

If there is no change in a frame frequency of a current input image in step S2, the timing controller 81 maintains a current black data insertion percentage without change in step S3.

If a frame frequency of the current input image falls in step S4, the timing controller 81 lowers a current black data insertion percentage in step S5 so as to maintain a flicker at a low level. As described above, when the frame frequency falls, the timing controller 81 reduces a time difference between the first and second pulses P1 and P2 of the gate start pulse GSP and reduces the delay value of the second period signal T2 of the gate output enable signals GOE1 to GOE5, and thus reduces write time of the black gray scale voltage within the 1 frame period.

If a frame frequency of the current input image rises in step S6, the timing controller 81 raise the current black data insertion percentage in step S7 so as to obtain the impulse effect to the satisfactory extent that a motion blur phenomenon does not occur in a moving picture. When the frame frequency rises after a fall in the frame frequency, the timing controller 81 lengthens a time difference between the first and second pulses P1 and P2 of the gate start pulse GSP and increases the delay value of the second period signal T2 of the gate output enable signals GOE1 to GOE5, and thus increases write time of the black gray scale voltage within the 1 frame period.

As described above, the liquid crystal display and the method of driving the same according to the exemplary embodiment reduce a black data insertion percentage by checking a frame frequency of the liquid crystal display driven in a black data insertion manner in real-time and by controlling timing of a gate timing control signal when the frame frequency falls, and thus can prevent a flicker. Furthermore, the liquid crystal display and the method of driving the same according to the exemplary embodiment adjust a black data insertion percentage depending on changes in a frame frequency, and thus can an impulse drive effect such as the prevention of a motion blur phenomenon at any frame frequency.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

What is claimed is:

1. A liquid crystal display, comprising:

a liquid crystal panel comprising liquid crystal cells in a matrix array at crossings of data lines and gate lines;

a data drive circuit configured to provide positive and negative data voltages and a black gray scale voltage to the data lines;

a plurality of gate drive integrated circuits configured to provide gate signals to the gate lines;

a frame frequency detector configured to detect a frame frequency of an input image by counting vertical sync signals based on a fixed clock signal irrespective of the frame frequency; and a timing controller configured to control operation timings of the data drive circuit and the gate drive integrated circuits, and to modulate gate timing control signals for controlling the gate drive integrated circuits depending on changes of the frame frequency to change a write time of the black gray scale voltage charged to the liquid crystal cells, wherein the gate timing control signals comprise a gate start pulse that is applied to one of the gate drive integrated circuits and controls black data insertion percentage in a frame, wherein the gate start pulse indicates a scan start line of a scan operation such that the one of the gate drive integrated circuits is configured to generate a first gate signal, and comprises first and second pulses each comprising a different width, wherein the gate start pulse comprises the first pulse and the second pulse of which a delay value changes depending on the black data insertion percentage, and wherein the timing controller is further configured to:

reduce a time difference between the first and second pulses of the gate start pulse to reduce the write time of the black gray scale voltage when the frame frequency falls, and lengthen the time difference between the first and second pulses of the gate start pulse to increase the write time of the black gray scale voltage when the frame frequency rises after the frame frequency has fallen.

2. The liquid crystal display according to claim 1, wherein the gate timing control signal includes a first gate start pulse for controlling timing of the gate drive circuits to provide video data and a second gate start pulse for controlling timing of the gate drive circuits to provide black gray level voltage such that an amount of delay between the first gate start pulse and the second gate start pulse controls black data insertion percentage in a frame.

3. The liquid crystal display according to claim 1, wherein when the black data insertion percentage is less than or equal to 20%, blocks of gate lines are driven by the timing controller sequentially going through a data write operation, a data hold operation, and a black insertion operation, and when the black data insertion percentage is more than 20%, the blocks are driven by the timing controller sequentially going through a data write operation, a data hold operation, a black insertion operation, and a black hold operation.

4. The liquid crystal display according to claim 1, wherein the timing controller is connected to a first gate drive integrated circuit chip to receive a gate start pulse and remaining gate drive integrated circuit chips are connected to each other to receive a gate start pulse.

5. The liquid crystal display of claim 1, wherein the gate timing control signals further comprise a plurality of gate output enable signals that are applied to the gate drive integrated circuits, respectively, a phase of each gate output enable signal being sequentially shifted, each of the gate output enable signals including a first period signal synchronized with the data voltage, a second period signal cutting off an output of the gate drive integrated circuits, and a third period signal synchronized with the black gray scale voltage.

6. The liquid crystal display of claim 5, wherein when the frame frequency falls, the timing controller reduces a time difference between the first pulse and the second pulse of the gate start pulse and reduces a width of the second period signal of each of the gate output enable signals to shorten the write time of the black gray scale voltage within 1 frame period.

7. The liquid crystal display of claim 5, wherein when the frame frequency rises, the timing controller increases a time difference between the first pulse and the second pulse of the gate start pulse and widens a width of the second period signal of each of the gate output enable signals to lengthen the write time of the black gray scale voltage within 1 frame period.

8. The liquid crystal display of claim 1, wherein:

the first pulse of the gate start pulse has a pulse width which is one horizontal period;

the second pulse of the gate start pulse has a pulse width which is N-horizontal periods; and N is an integer greater than or equal to 3.

9. A method for driving a liquid crystal display having a liquid crystal panel with liquid crystal cells, a data drive circuit, a gate drive integrated circuits, and a timing controller, the method comprising:

counting vertical sync signals based on a fixed clock signal to check a frame frequency of a current input image in real-time, the fixed clock signal being irrespective of the frame frequency; and modulating gate timing control signals for controlling the gate drive integrated circuits depending on changes of the frame frequency to change a write time of a black gray scale voltage charged to the liquid crystal cells, wherein the gate timing control signals comprise a gate start pulse that is applied to one of the gate drive integrated circuits and controls a current black data insertion percentage in a frame, wherein the gate start pulse indicates a scan start line of a scan operation such that the one of the gate drive integrated circuits generates a first gate signal, and comprises first and second pulses each comprising a different width, wherein the gate start pulse comprises the first pulse and the second pulse of which a delay value changes depending on the black data insertion percentage, and wherein the modulating the gate timing control signals comprises:

reducing a time difference between the first and second pulses of the gate start pulse to reduce the write time of the black gray scale voltage when the frame frequency falls, and lengthening the time difference between the first and second pulses of the gate start pulse to increase the write time of the black gray scale voltage when the frame frequency rises after the frame frequency has fallen.

10. The method for driving a liquid crystal display according to claim 9, wherein the current black data insertion percentage is controlled by lowering the current black data insertion percentage if a frame frequency of the current input image falls.

11. The method for driving a liquid crystal display according to claim 9, wherein the current black data insertion percentage is controlled by increasing the current black data insertion percentage if a frame frequency of the current input image rises.

* * * * *